United States Patent
Ko et al.

(10) Patent No.: US 12,260,565 B2
(45) Date of Patent: Mar. 25, 2025

(54) IMAGE PROCESSING-BASED FOREIGN SUBSTANCE DETECTION METHOD IN WIRELESS CHARGING SYSTEM AND DEVICE PERFORMING METHOD

(71) Applicant: ELECTRONICS AND TELECOMMUNICATIONS RESEARCH INSTITUTE, Daejeon (KR)

(72) Inventors: Gwangzeen Ko, Daejeon (KR); Jung Ick Moon, Daejeon (KR); Sang-Won Kim, Daejeon (KR); Seong-Min Kim, Daejeon (KR); In Kui Cho, Daejeon (KR); Woo Jin Byun, Daejeon (KR); Je Hoon Yun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 425 days.

(21) Appl. No.: 17/698,632

(22) Filed: Mar. 18, 2022

(65) Prior Publication Data
US 2023/0030303 A1 Feb. 2, 2023

(30) Foreign Application Priority Data
Jul. 29, 2021 (KR) .................. 10-2021-0099777

(51) Int. Cl.
*G06T 7/00* (2017.01)
*G06T 7/292* (2017.01)
(Continued)

(52) U.S. Cl.
CPC ............. *G06T 7/292* (2017.01); *G06T 7/40* (2013.01); *G06T 7/70* (2017.01); *G06T 7/90* (2017.01);
(Continued)

(58) Field of Classification Search
CPC .. G06T 7/292; G06T 7/40; G06T 7/70; G06T 7/90; G06T 2207/10024; G06T 7/0004;
(Continued)

(56) References Cited

U.S. PATENT DOCUMENTS

2019/0130151 A1  5/2019  Lee et al.
2019/0312468 A1  10/2019  Kwon et al.
(Continued)

FOREIGN PATENT DOCUMENTS

JP  2017-135838 A  8/2017
JP  2019-216502 A  12/2019
(Continued)

*Primary Examiner* — Xiao Liu
(74) *Attorney, Agent, or Firm* — LRK PATENT LAW FIRM

(57) ABSTRACT

An image processing-based foreign substance detection method in a wireless charging system and a device performing the method are disclosed. A method for detecting a foreign substance includes an operation of acquiring an image of a charging area of a wireless charging system, an operation of detecting, based on an RGB value of a frame of the image, a foreign substance in the charging area, an operation of discriminating a type of the foreign substance, and an operation of performing power control of the wireless charging system according to the type of the foreign substance.

12 Claims, 6 Drawing Sheets

(51) Int. Cl.
  *G06T 7/40*       (2017.01)
  *G06T 7/70*       (2017.01)
  *G06T 7/90*       (2017.01)
  *G06V 20/52*      (2022.01)

(52) U.S. Cl.
  CPC .... *G06V 20/52* (2022.01); *G06T 2207/10024* (2013.01); *G06V 2201/07* (2022.01)

(58) Field of Classification Search
  CPC .. G06V 20/52; G06V 2201/07; G06V 10/443; G06V 10/751; H02J 50/60; G06F 18/24; H04N 7/18; H04N 23/10
  See application file for complete search history.

(56)           References Cited

U.S. PATENT DOCUMENTS

2021/0019640 A1    1/2021   Kim et al.
2022/0176912 A1*   6/2022   Zhang ................. B60S 1/0896

FOREIGN PATENT DOCUMENTS

| KR | 10-1183664    | B1 | 9/2012  |            |
|----|---------------|----|---------|------------|
| KR | 10-1213649    | B1 | 12/2012 |            |
| KR | 10-1397624    | B1 | 5/2014  |            |
| KR | 20150129575   | A  * | 5/2014  | ............. G01N 25/72 |
| KR | 10-2015-0129575 | A  | 11/2015 |            |
| KR | 10-1687710    | B1 | 12/2016 |            |
| KR | 10-1742553    | B1 | 6/2017  |            |
| KR | 10-2017-0110436 | A | 10/2017 |            |
| KR | 10-1812444    | B1 | 12/2017 |            |
| KR | 10-2018-0000205 | A | 1/2018  |            |
| KR | 10-2018-0037499 | A | 4/2018  |            |
| KR | 10-2018-0047082 | A | 5/2018  |            |
| KR | 10-2018-0064741 | A | 6/2018  |            |
| KR | 10-2018-0065693 | A | 6/2018  |            |
| KR | 10-1879577    | B1 | 7/2018  |            |
| KR | 10-2019-0015953 | A | 2/2019  |            |
| KR | 10-2019-0050301 | A | 5/2019  |            |
| KR | 10-2019-0077836 | A | 7/2019  |            |
| KR | 10-2019-0087733 | A | 7/2019  |            |
| KR | 10-2019-0111375 | A | 10/2019 |            |
| KR | 10-2074475    | B1 | 2/2020  |            |
| KR | 10-2077567    | B1 | 2/2020  |            |
| KR | 10-2077568    | B1 | 2/2020  |            |
| KR | 10-2081413    | B1 | 2/2020  |            |
| KR | 10-2020-0022764 | A | 3/2020  |            |
| KR | 10-2020-0056618 | A | 5/2020  |            |
| KR | 10-2020-0056762 | A | 5/2020  |            |
| KR | 10-2112498    | B1 | 5/2020  |            |
| KR | 10-2020-0073834 | A | 6/2020  |            |
| KR | 10-2127167    | B1 | 6/2020  |            |
| KR | 10-2020-0086827 | A | 7/2020  |            |
| KR | 10-2020-0091366 | A | 7/2020  |            |
| KR | 10-2136667    | B1 | 7/2020  |            |
| KR | 10-2020-0099916 | A | 8/2020  |            |
| KR | 10-2154447    | B1 | 9/2020  |            |
| KR | 10-2020-0124866 | A | 11/2020 |            |
| WO | WO-2022016328 | A1 * | 1/2022 | ............. G01N 21/25 |

* cited by examiner

IMAGE PROCESSING-BASED FOREIGN SUBSTANCE DETECTION METHOD IN WIRELESS CHARGING SYSTEM AND DEVICE PERFORMING METHOD

CROSS-REFERENCE TO RELATED APPLICATION

This application claims the benefit of Korean Patent Application No. 10-2021-0099777 filed on Jul. 29, 2021, in the Korean Intellectual Property Office, the entire disclosure of which is incorporated herein by reference for all purposes.

BACKGROUND

1. Field of the Invention

One or more example embodiments relate to an image processing-based foreign substance detection method in a wireless charging system and a device performing the method.

2. Description of Related Art

A wireless charging technology is based on a strong magnetic field. Thus, when a metal substance enters a charging area, charging efficiency may be reduced and a fire may occur due to heat. In addition, when a living creature such as a part of a human body or an animal enters the charging area, harm to the living organism may occur.

A foreign substance detection technology according to a related art uses a method of installing a detection coil separate from a charging coil in a charging area to detect a foreign substance through presence or absence of a change in electromagnetic characteristic of the detection coil, or a method of directly measuring a change in electromagnetic characteristics of a charging coil itself of a receiving end to detect a foreign substance.

In the method using the detection coil, it is necessary to install an additional coil and minimize influence of the charging coil, and thus a detailed design is required. In addition, it is difficult to detect a foreign substance that is less sensitive to the electromagnetic characteristics with the method using the detection coil.

The method of directly measuring the electromagnetic characteristics of the charging coil is effective in a power variation range in which the change in the electromagnetic characteristics of the foreign substance is significant. Therefore, the method is mainly used by a low power charging system, and it is difficult to use the method with respect to medium/high power transmission. In addition, in the method according to a related art, an electromagnetic variance such as a power/voltage/current/Q value or the like collected from the receiving end is transmitted to the transmitting end to allow the transmitting end to perform power control, and thus there is a need for a periodic and reliable communication channel between the receiving end and the transmitting end.

SUMMARY

Example embodiments provide a technology capable of accurately and safely detecting a foreign substance that enters a charging area using an image processing technology in a wireless charging system.

However, a technical issue is not limited to the above-described technical issues, and other technical issues may exist.

According to an aspect, there is provided a method for detecting a foreign substance, the method including an operation of acquiring an image of a charging area of a wireless charging system, an operation of detecting, based on an RGB value of a frame of the image, a foreign substance in the charging area, an operation of discriminating a type of the foreign substance, and an operation of performing power control of the wireless charging system according to the type of the foreign substance.

The operation of detecting the foreign substance may include an operation of detecting a change in the image by comparing a difference in RGB values between frames of the image with a preset threshold value, and an operation of discriminating a change factor of the image.

The operation of discriminating the change factor of the image may include an operation of detecting, based on a feature frame acquired by filtering the frame of the image, an environmental change in the charging area, and an operation of terminating a foreign substance detection operation when the environmental change is detected.

The operation of discriminating the change factor of the image may include an operation of detecting, based on the difference in RGB values of between frames of the image, ingress of the foreign substance, and an operation of recording and learning ingress of the foreign substance.

The operation of detecting the foreign substance may further include an operation of re-detecting the change in the image when the change factor of the image is not discriminated.

The operation of discriminating the type of the foreign substance may include an operation of classifying, based on a magnitude, a position, or a frame variance of a change in the image, the foreign substance.

According to another aspect, there is provided a device for detecting a foreign substance, the device including a memory configured to store one or more instructions, and a processor configured to execute the instructions. When the instructions are executed, the processor may be configured to acquire an image of a charging area of a wireless charging system, detect, based on an RGB value of a frame of the image, a foreign substance in the charging area, discriminate a type of the foreign substance, and perform power control of the wireless charging system according to the type of the foreign substance.

The processor may be configured to detect a change in the image by comparing a difference in RGB values between frames of the image with a preset threshold value, and discriminate a change factor of the image.

The processor may be configured to detect, based on a feature frame acquired by filtering the frame of the image, an environmental change in the charging area, and terminate a foreign substance detection operation when the environmental change is detected.

The processor may be configured to detect, based on the difference in the RGB values between the frames of the image, ingress of the foreign substance, and record and learn ingress of the foreign substance.

The processor may be configured to re-detect the change in the image when the change factor of the image is not discriminated.

The processor may be configured to classify, based on a magnitude, a position, or a frame variance of a change in the image, the foreign substance.

According to still another aspect, there is provided a device for detecting a foreign substance, the device including an image collector configured to acquire an image of a charging area of a wireless charging system, a foreign substance detector configured to detect, based on an RGB value of a frame of the image, a foreign substance in the charging area, a foreign substance classifier configured to discriminate a type of the foreign substance, and a wireless charging power controller configured to perform power control of the wireless charging system according to the type of the foreign substance.

The foreign substance detector may include an image change detector configured to detect a change in the image by comparing a difference in RGB values between frames of the image with a preset threshold value.

The foreign substance detector may further include an environmental change detector configured to detect, based on a feature frame acquired by filtering the frame of the image, an environmental change in the charging area.

The foreign substance detector may further include a foreign substance presence detector configured to detect, based on the difference between the RGB values of the frames of the image, ingress of the foreign substance.

The foreign substance detector may further include an exception handler configured to allow re-detection of the image to be performed when the change factor of the image is not discriminated.

The foreign substance classifier may be configured to classify, based on a magnitude, a position, or a frame variance of a change in the image, the foreign substance.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION OF THE INVENTION

Figure 1:
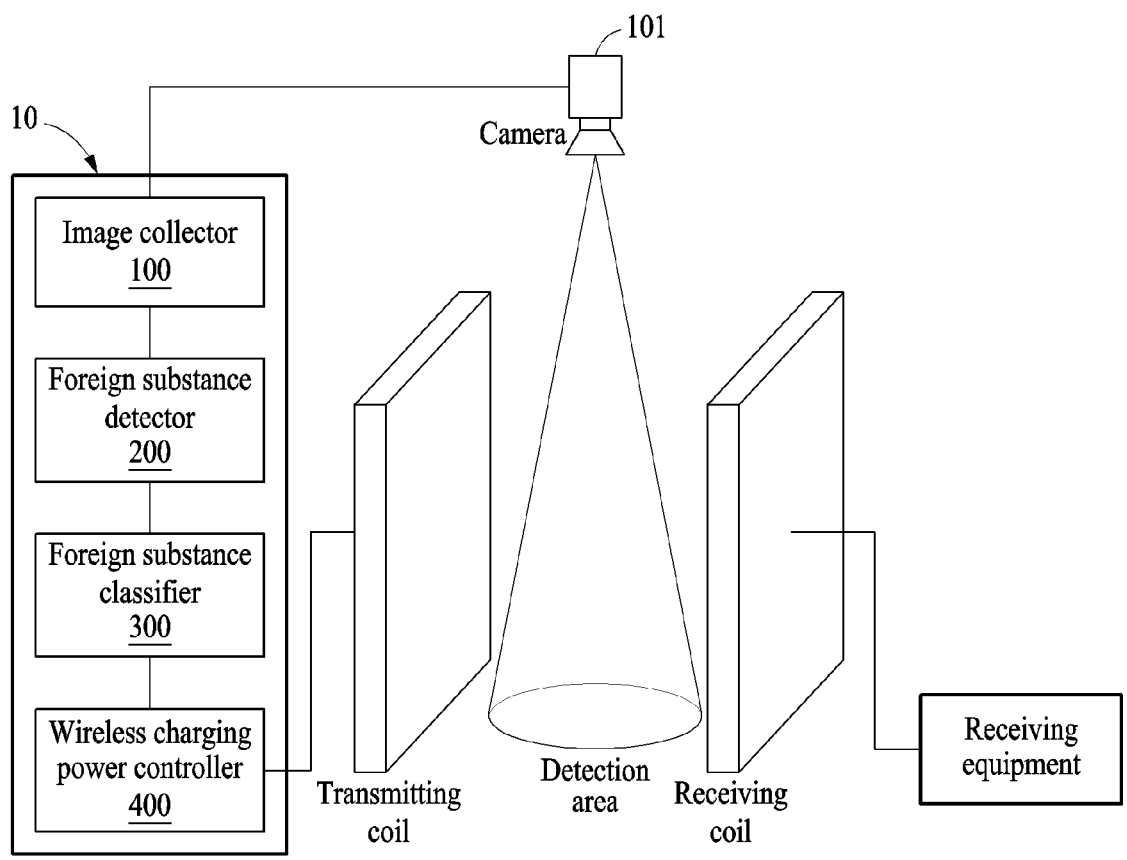
FIG. 1 is a schematic block diagram illustrating a foreign substance detection device according to an example embodiment.

The following structural or functional descriptions of example embodiments described herein are merely intended for the purpose of describing the example embodiments described herein and may be implemented in various forms. Here, the example embodiments are not construed as limited to the disclosure and should be understood to include all changes, equivalents, and replacements in the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component in the scope of the present disclosure.

When it is mentioned that one component is "connected" or "accessed" to another component, it may be understood that the one component is directly connected or accessed to another component or that still other component is interposed between the two components.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings. When describing the example embodiments with reference to the accompanying drawings, like reference numerals refer to like components and a repeated description related thereto will be omitted.

FIG. 1 is a schematic block diagram illustrating a foreign substance detection device according to an example embodiment.

A foreign substance detection device 10 may receive an image of a charging area of a wireless charging system, detect a foreign substance that enters the charging area, and discriminate a type of the foreign substance. The foreign substance detection device 10 may perform power control of the wireless charging system according to the type of the detected foreign substance.

The foreign substance detection device 10 may detect, based on a trained neural network, the foreign substance.

A neural network (or artificial neural network) may include a statistical learning algorithm that mimics a biological neural network in machine learning and cognitive science. The neural network may generally refer to a model that has an artificial neuron (node) forming a network through a synaptic interconnection, and acquires a problem-solving capability as the artificial neuron (node) changes a strength of the synaptic interconnection through learning.

A neuron of the neural network may include a combination of weights or biases. The neural network may include one or more layers including one or more neurons or nodes.

The neural network may infer a result to be predicted from an arbitrary input by changing a weight of the neuron through learning.

The neural network may include a deep neural network. The neural network include a convolutional neural network (CNN), recurrent neural network (RNN), perceptron, multilayer perceptron, feed forward (FF), radial basis network (RBF), deep feed forward (DFF), long short term memory (LSTM), gated recurrent unit (GRU), auto encoder (AE), variational auto encoder (VAE), denoising auto encoder (DAE), sparse auto encoder (SAE), Markov chain (MC), Hopfield network (HN), Boltzmann machine (BM), restricted Boltzmann machine (RBM), deep belief network (DBN), deep convolutional network (DCN), deconvolutional network (DN), deep convolutional inverse graphics network (DCIGN), generative adversarial network (GAN), liquid state machine (LSM), extreme learning machine (ELM), echo state network (ESN), deep residual network (DRN), differentiable neural computer (DNC), neural turning machine (NTM), capsule network (CN), Kohonen network (KN), and attention network (AN).

The foreign substance detection device 10 may be implemented as a printed circuit board (PCB) such as a motherboard, an integrated circuit (IC), or a system on chip (SoC). For example, the foreign substance detection device 10 may be implemented as an application processor.

In addition, the foreign substance detection device 10 may be implemented as a personal computer (PC), a data server, or the like.

The foreign substance detection device 10 may detect a foreign substance in a charging area through an optical change according to image processing, and the foreign substance detection device 10 may be used regardless of an output of the wireless charging system. In addition, when the foreign substance detection device 10 is used, continuous charging may be possible in a structure independent of a charging device of the wireless charging system. The foreign substance detection device 10 may perform effective and safe foreign substance detection through image processing of a wireless charging area.

The foreign substance detection device 10 may include an image collector 100, a foreign substance detector 200, a foreign substance classifier 300, and a wireless charging power controller 400.

The image collector 100 may collect an image of a charging area between a transmitting coil and a receiving coil, using the camera 101. The image collector 100 may process the collected image, and output the processed image to the foreign substance detector 200.

The foreign substance detector 200 may detect, from the image received from the image collector 100, whether a foreign substance enters the charging area. Specifically, the foreign substance detector 200 may detect a change in the received image, and discriminate what an image change factor (for example, an environmental change in a wireless charging area, ingress of the foreign substance, and the like) is. When the foreign substance is detected in the charging area, the foreign substance detector 200 may output the image to the foreign substance classifier 300.

The foreign substance classifier 300 may analyze the image received from the foreign substance detector 200 to discriminate a type of the foreign substance that enters the charging area. The foreign substance classifier 300 may transmit the discriminated type of the foreign substance to the wireless charging power controller 400.

The wireless charging power controller 400 may perform power control of the wireless charging system according to the type of the foreign substance received from the foreign substance classifier 300. The wireless charging power controller 400 may directly remove the foreign substance, invoke an administrator, or generate a differentiated warning sound according to the type of the foreign substance to effectively and safely remove the foreign substance.

Figure 2:
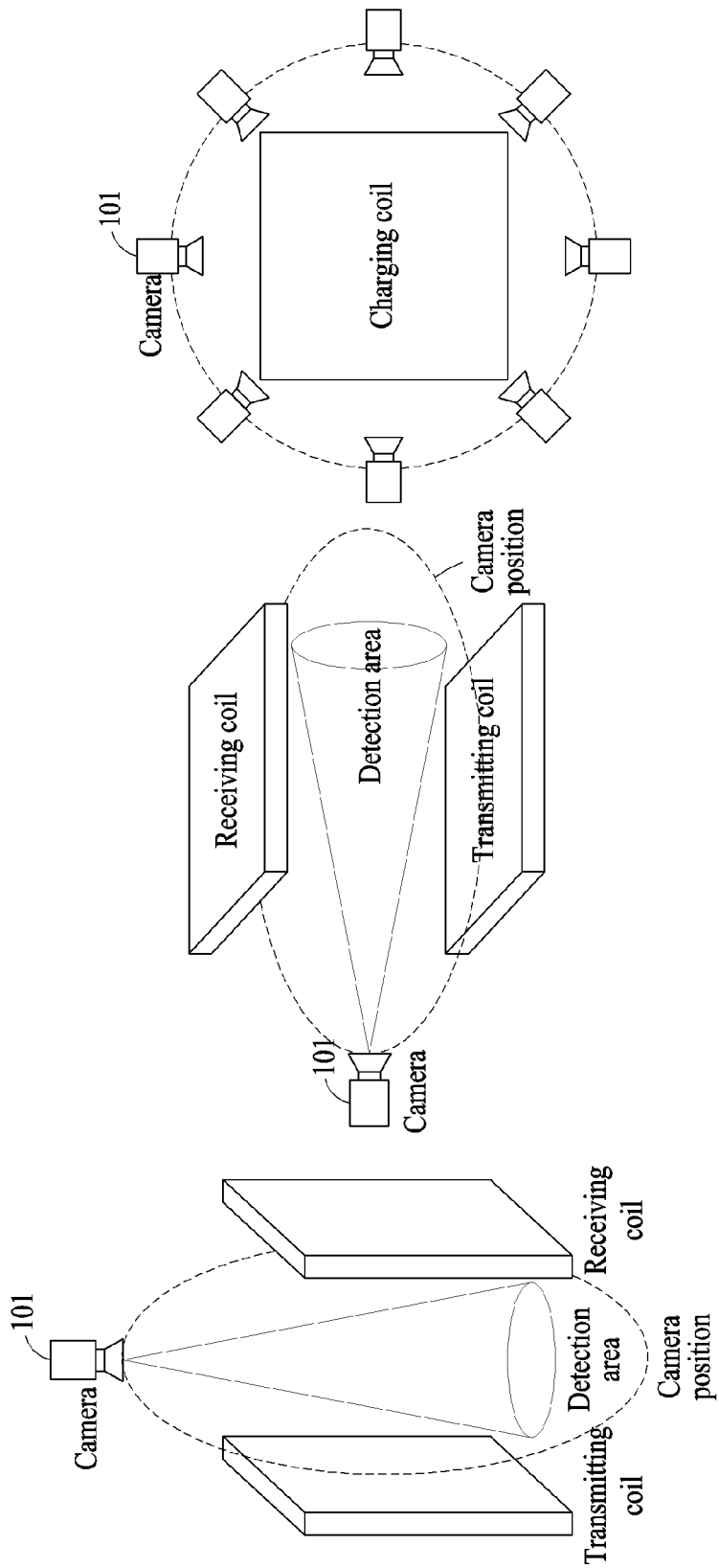
FIG. 2 is a diagram illustrating an example of a configuration and position of the camera illustrated in FIG. 1.

FIG. 2 is a diagram illustrating an example of a configuration and position of the camera illustrated in FIG. 1.

The image collector 100 may include the camera 101. The image collector 100 may detect the charging area between the transmitting coil and the receiving coil, using the camera 101. The camera 101 may be installed in an arbitrary direction capable of collecting the image of the charging area. For example, the camera 101 may be installed in a direction perpendicular or parallel to the ground according to a structure of a charging device.

There may be two or more cameras 101, and the image collector 100 may process images collected from a plurality of cameras 10 together.

Figure 3:
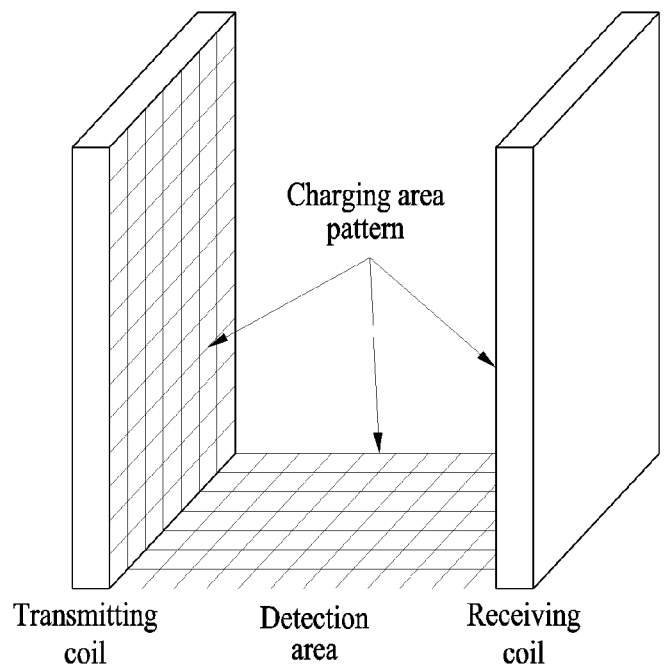
FIG. 3 is a diagram illustrating an example of the detection area illustrated in FIG. 1.

FIG. 3 is a diagram illustrating an example of the detection area illustrated in FIG. 1.

A wireless charging system may perform efficient foreign substance detection by forming a pattern in a charging area. For example, a grid pattern formed in the charging area may help image processing.

Hereinafter, an operation of detecting and classifying, by a foreign substance detection device, a foreign substance is described with reference to FIGS. 4 to 8.

Figure 4:
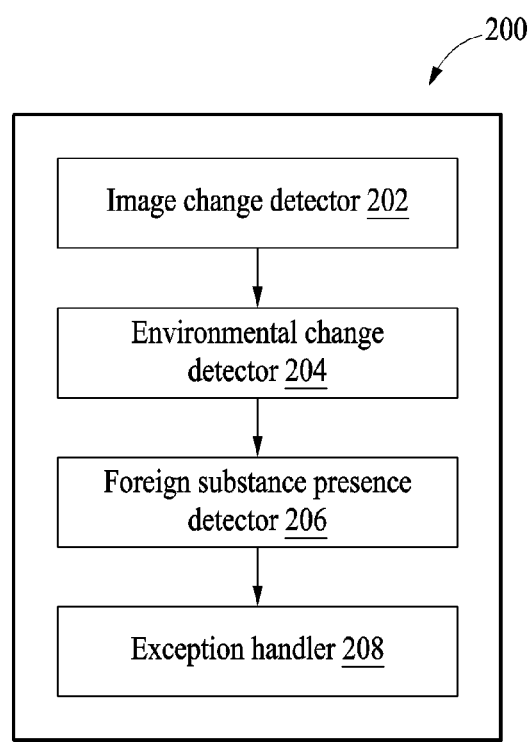
FIG. 4 is a diagram illustrating an example of a structure of a foreign substance detector.
Figure 5:
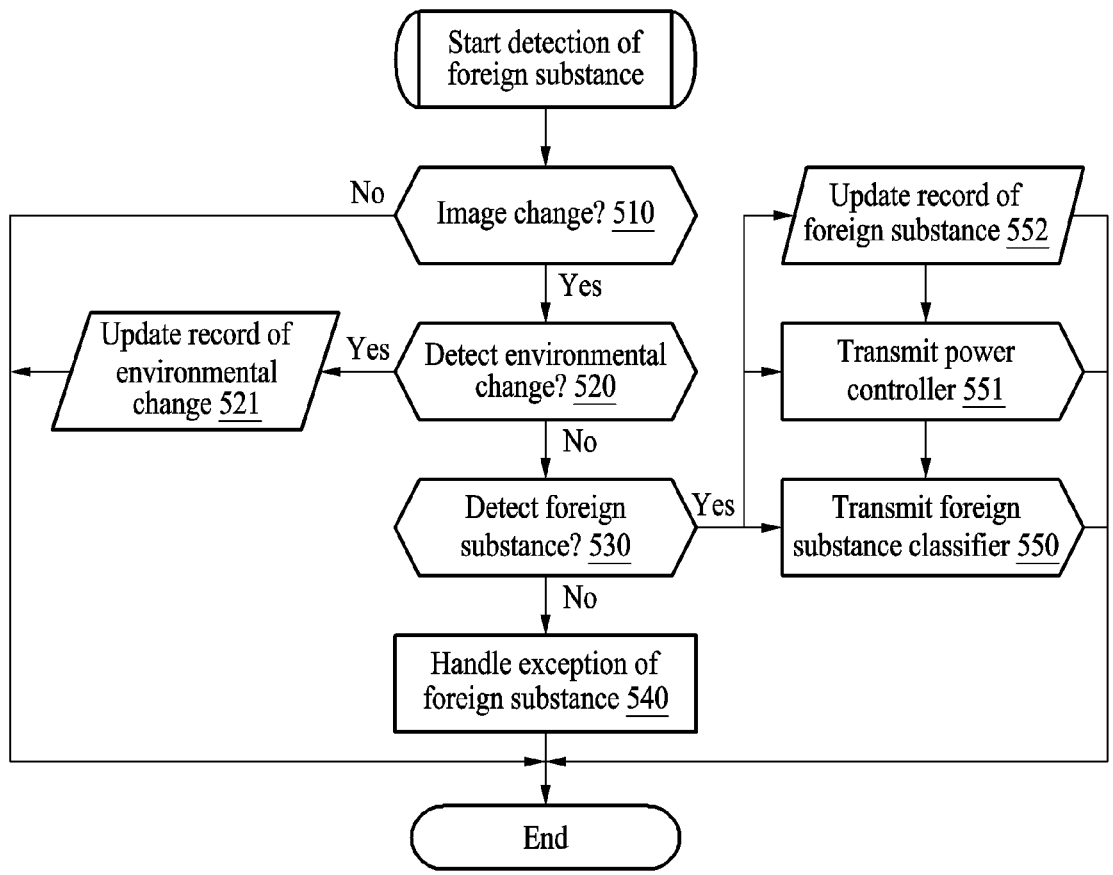
FIG. 5 is a diagram illustrating a foreign substance detection operation.

FIG. 4 is a diagram illustrating an example of a structure of a foreign substance detector, and FIG. 5 is a diagram illustrating a foreign substance detection operation.

The foreign substance detector 200 may include an image change detector 202, an environmental change detector 204, a foreign substance presence detector 206, and an exception handler 208.

In operation 510, the image change detector 202 may receive an image from the image collector 100 and detect a change in the image. Specifically, the image change detector 202 may compare frames of the image. In addition, the image change detector 202 may perform outline detection using a difference between RGB values of pixels of the image or a wavelet filter.

When the image change detector 202 detects the image change, a detection result may be outputted to the environmental change detector 204. When the image change is not detected, a foreign substance detection operation may be terminated. When the foreign substance detection operation is terminated, the power controller 400 may maintain a previous state thereof.

In operation 520, the environmental change detector 204 may receive the image, and discriminate whether the change in the image is caused by an environmental change (for example, shading, lighting, shadow, and diffuse reflection) in a wireless charging area. When the change in the image is caused by the environmental change, the environmental change detector 204 may record, in the memory 910, the image and an environmental change factor, and terminate the foreign substance detection operation. When the environmental change is not detected, the environmental change detector 204 may output the image to the foreign substance presence detector 206.

In operation 530, the foreign substance presence detector 206 may receive the image, and discriminate whether the change in the image is caused by ingress of a foreign substance. The foreign substance presence detector 206 may determine whether the foreign substance is present using data stored in the memory 910. When presence of the foreign substance is not detected, the foreign substance presence detector 206 may output the image to the exception handler 208.

In operation 540, the exception handler 208 may output, to the image change detector 202, the image received from the foreign substance presence detector 206 to re-detect whether the image is changed or terminate a foreign substance detection procedure.

In operation 550, when the change in the image is caused by ingress of the foreign substance, the foreign substance presence detector 206 may output the image to the foreign substance classifier 300. In addition, in operation 551, the foreign substance presence detector 206 may output, to the wireless charging power controller 400, whether the foreign substance is present to allow immediate power control to be performed. In operation 552, the foreign substance presence detector 206 may record, in the memory 910, the image and whether the foreign substance enters.

Figure 6:
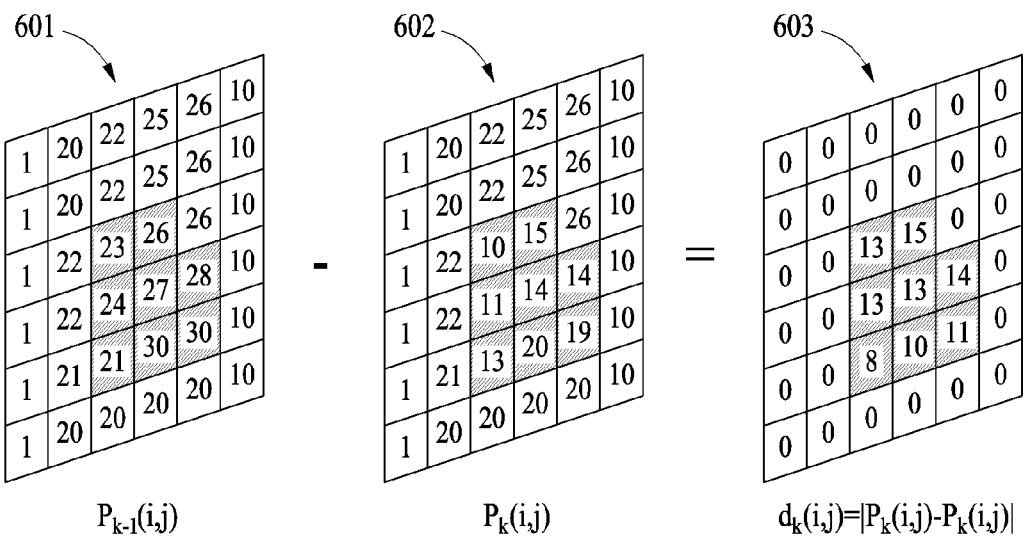
FIG. 6 is a diagram illustrating an image change detection operation.

FIG. 6 is a diagram illustrating an image change detection operation.

The image change detector 202 may receive an image of a charging area from the image collector 100. The image change detector 202 may detect a change in the image by comparing a difference between RGB values of frames of the received image with a preset threshold value. The image change detector 202 may output the image to the environmental change detector 204 when the change in the image is detected, and may terminate a foreign substance detection operation when the change in the image is not detected.

The image change detector 202 may compare a first image frame $P_{k-1}(i,j)$ 601 that is a first frame of the received image with a second image frame $P_k(i,j)$ 602 that is a second frame of the received image. The image change detector 202 may calculate a difference $d_k(i,j)$ 603 between an RGB value of the first image frame $P_{k-1}(i,j)$ 601 and an RGB value of the second image frame $P_k(i,j)$ 602. The difference $d_k(i,j)$ 603 between the RGB values may be calculated through Equation 1.

$$d_k(i,j)=|P_k(i,j)-P_k(i,j)| \quad \text{[Equation 1]}$$

Here, (i, j) may be coordinates of a pixel.

The image change detector 202 may sum all difference values of the RGB values and compare a total sum of the difference values with a threshold value. The total sum of the difference values of the RGB values may be calculated through Equation 2.

$$d_k = \Sigma_i \Sigma_j d_k(i,j) \quad \text{[Equation 2]}$$

When the total sum of the difference values of the RGB values is greater than a preset threshold, the image change detector 202 may determine that a change occurs in the image.

The image change detector 202 may detect the change in the image using a square value of a difference between the RGB values. The square value of the difference between the RGB values may be calculated through Equation 3.

$$d_k(i,j)=|P_k(i,j)-P_k(i,j)|^2 \quad \text{[Equation 3]}$$

In addition, the image change detector 202 may detect the change in the image while striding every specific frame without detecting all frames of consecutive images. Thus, the image change detector 202 may adjust an image processing speed or image detection period.

Figure 7:
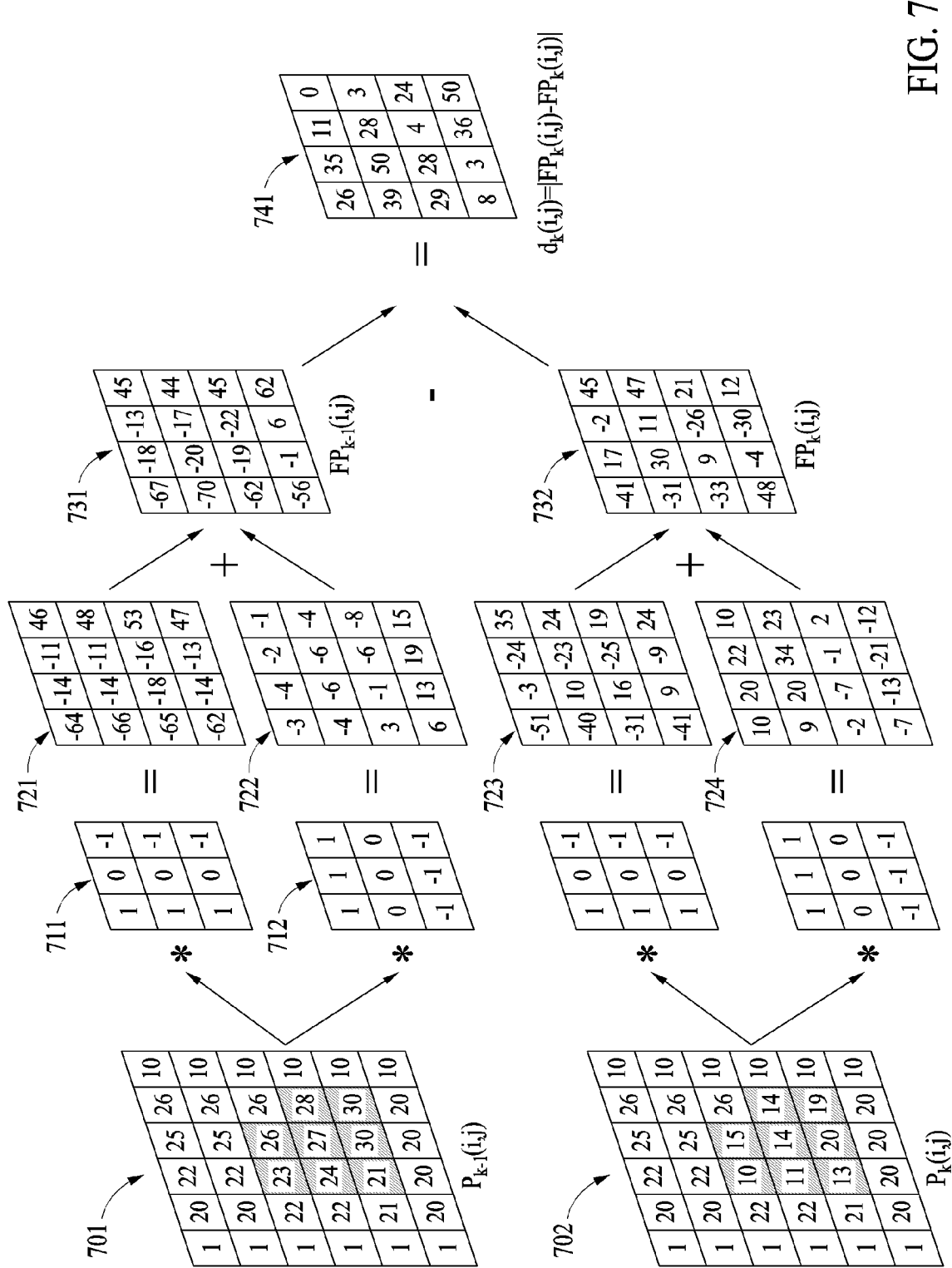
FIG. 7 is a diagram illustrating an environmental change detection operation.

FIG. 7 is a diagram illustrating an environmental change detection operation. The environmental change detector 204 may receive an image from the image change detector 202 to detect an environmental change in a charging area. The environmental change detector 204 may detect, based on a feature frame acquired by filtering a frame of the image, the environmental change in the charging area. The environmental change detector 204 may terminate a foreign substance detection operation when an environmental change in the image of the charging area is detected, and may output the image to the foreign substance presence detector 206 when the environmental change is not detected.

The environmental change in the charging area may include a change in lighting, a change in shading, diffuse reflection, and the like. The environmental change in the charging area may not affect a characteristic (for example, an outline) of a subject. The environmental change detector 204 may acquire a feature frame through filtering of the frame of the image. The filter may include a vertical filter, a horizontal filter, and the like for acquiring a characteristic of the frame, and the number and types of filters are not limited.

The environmental change detector 204 may compare a first image frame $P_{k-1}(i,j)$ 701 that is a first frame of the received image with a second image frame $P_{k-1}(i,j)$ 702 that is a second frame of the received image. The environmental change detector 204 may perform a convolution operation of RGB values of image frames (for example, 701 and 702) and filters (for example, 711 and 712).

The environmental change detector 204 may perform a convolution operation of the RGB value of the first image frame $P_{k-1}(i,j)$ 701 and the filters 711 and 712. When the RGB value of the first image frame $P_{k-1}(i,j)$ 701 is filtered with the first filter 711 that is a vertical filter, a first filtering frame 721 may be acquired. When the RGB value of the first image frame $P_{k-1}(i,j)$ 701 is filtered with the second filter 712 that is a horizontal filter, a second filtering frame 722 may be acquired.

The environmental change detector 204 may acquire a first feature frame $FP_{k-1}(i,j)$ 731 by summing the first filtering frame 721 and the second filtering frame 722. That is, the environmental change detector 204 may acquire the first feature frame $FP_{k-1}(i,j)$ 731 from the first image frame $P_{k-1}(i,j)$ 701.

The environmental change detector 204 may acquire a second feature frame $FP_k(i,j)$ 732 by performing the same operation on the second image frame $P_k(i,j)$ 702.

The environmental change detector 204 may detect whether a change in the image is caused by the environmental change in the charging area, using a difference between the first feature frame $FP_{k-1}(i,j)$ 731 and the second feature frame $FP_k(i,j)$ 732.

The environmental change detector 204 may detect the environmental change in the charging area while striding every specific frame without detecting all frames of consecutive images. Thus, the environmental change detector 202 may adjust an image processing speed or image detection period.

Figure 8:
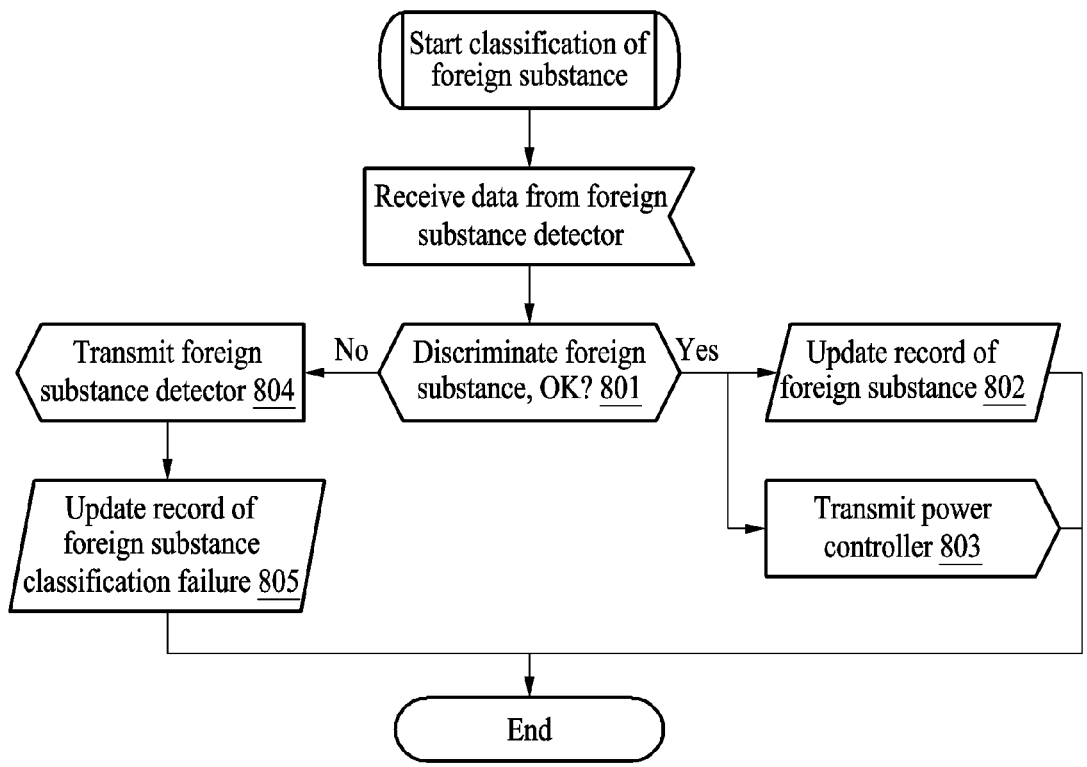
FIG. 8 is a diagram illustrating a foreign substance type discrimination operation.

FIG. 8 is a diagram illustrating a foreign substance type discrimination operation.

In operation 801, the foreign substance classifier 300 may receive an image from the foreign substance detector 200 to discriminate a type of a foreign substance. The foreign substance classifier 300 may discriminate the type of the foreign substance considering a magnitude, a position, a frame variance, and the like of an image change. A foreign substance type discrimination operation performed by the foreign substance classifier 300 may be learned by a neural network.

In operation 802, when the type of the foreign substance is discriminated, the foreign substance classifier 300 may record the type of the foreign substance and the image in the memory 910. In addition, in operation 803, the foreign substance classifier 300 may output the type of the foreign substance to the power controller 400 to perform power control according to the type of the foreign substance.

In operation 804, when the type of the foreign substance is not discriminated, the foreign substance classifier 300 may output the image to the foreign substance detector 200 to perform re-detection. In operation 805, foreign substance classification failure may be recorded in the memory 910.

Figure 9:
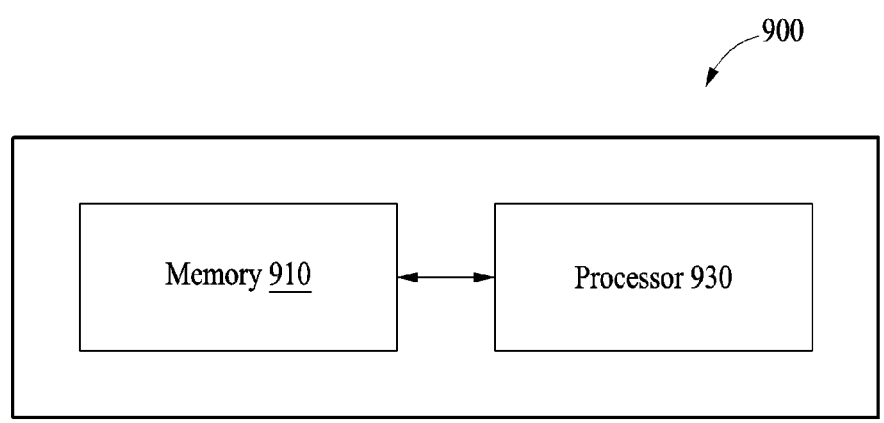
FIG. 9 is a diagram illustrating another example of a foreign substance detection device according to an example embodiment.

FIG. 9 is a diagram illustrating another example of a foreign substance detection device according to an example embodiment.

A foreign substance detection device 900 may be substantially the same as the foreign substance detection device 10 of FIG. 1. The foreign substance detection device 900 may include a memory 910 and a processor 930.

The memory 910 may store instructions (for example, programs) that are executable by the processor 930. For example, the instructions may include instructions for executing an operation of the processor 930 and/or an operation of each component of the processor 930.

The processor 930 may process data stored in the memory 910. The processor 930 may execute computer-readable code (for example, software) stored in the memory 910 and instructions induced by the processor 930.

The processor 930 may be a hardware-implemented data processing device having a circuit with a physical structure for executing desired operations. For example, the desired operations may include a code or instructions included in a program.

For example, the hardware-implemented data processing device may include a microprocessor, a central processing unit, a processor core, a multi-core processor, and a multi-processor, an application-specific integrated circuit (ASIC), and a field programmable gate array (FPGA).

The operation performed by the foreign substance detection device 900 may be substantially the same as the operation of foreign substance detection device 10 described with reference to FIGS. 1 to 9. Accordingly, a detailed description thereof will be omitted.

The components described in the example embodiments may be implemented by hardware components including, for example, at least one digital signal processor (DSP), a processor, a controller, an ASIC, a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The example embodiments described herein may be implemented using hardware components, software components, or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described example embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter.

The described hardware devices may be configured to act as one or more software modules in order to perform the operations of the above-described example embodiments, or vice versa.

While this disclosure includes example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method for detecting a foreign substance, the method comprising:

an operation of acquiring an image of a charging area of a wireless charging system;

an operation of detecting, based on an RGB value of a frame of the image, a foreign substance in the charging area;

an operation of discriminating a type of the foreign substance; and an operation of performing power control of the wireless charging system according to the type of the foreign substance, wherein the operation of detecting the foreign substance comprises:

an operation of detecting a change in the image by comparing a difference in RGB values between frames of the image with a preset threshold value; and an operation of discriminating a factor causing the change in the image, wherein the operation of discriminating the factor causing the change in the image comprises:

an operation of detecting, based on a feature frame acquired by filtering the frame of the image, whether there is an environmental change in the charging area; and an operation of terminating a foreign substance detection operation when the environmental change is detected.

2. The method of claim 1, wherein the operation of discriminating the factor causing the change in the image comprises:

an operation of detecting, based on the difference in the RGB values between the frames of the image, ingress of the foreign substance; and an operation of recording and learning ingress of the foreign substance.

3. The method of claim 1, wherein the operation of detecting the foreign substance further comprises an operation of re-detecting the change in the image when the factor causing the change in the image is not discriminated.

4. The method of claim 1, wherein the operation of discriminating the type of the foreign substance comprises an operation of classifying, based on a magnitude, a position, or a frame variance of a change in the image, the foreign substance.

5. A device for detecting a foreign substance, the device comprising:

a memory configured to store one or more instructions; and a processor configured to execute the instructions, wherein, when the instructions are executed, the processor is configured to:

acquire an image of a charging area of a wireless charging system;

detect, based on an RGB value of a frame of the image, a foreign substance in the charging area;

discriminate a type of the foreign substance; and perform power control of the wireless charging system according to the type of the foreign substance, wherein when detecting the foreign substance, the processor is configured to:

detect a change in the image by comparing a difference in RGB values between frames of the image with a preset threshold value; and discriminate a factor causing the change in the image, wherein when discriminating the factor causing the change in the image, the processor is configured to:

detect, based on a feature frame acquired by filtering the frame of the image, whether there is an environmental change in the charging area; and terminate a foreign substance detection operation when the environmental change is detected.

6. The device of claim 5, wherein the processor is configured to:

detect, based on the difference in the RGB values between the frames of the image, ingress of the foreign substance; and record and learn ingress of the foreign substance.

7. The device of claim 5, wherein the processor is configured to re-detect the change in the image when the factor causing the change in the image is not discriminated.

8. The device of claim 5, wherein the processor is configured to classify, based on a magnitude, a position, or a frame variance of a change in the image, the foreign substance.

9. A device for detecting a foreign substance, the device comprising:

an image collector configured to acquire an image of a charging area of a wireless charging system;

a foreign substance detector configured to detect, based on an RGB value of a frame of the image, a foreign substance in the charging area;

a foreign substance classifier configured to discriminate a type of the foreign substance; and a wireless charging power controller configured to perform power control of the wireless charging system according to the type of the foreign substance, wherein the foreign substance detector comprises:

an image change detector configured to detect a change in the image by comparing a difference in RGB values between frames of the image with a preset threshold value, and configured to, when the change in the image has been detected, transmit a detection result to an environmental change detector; and the environmental change detector configured to receive the detection result and detect, based on a feature frame acquired by filtering the frame of the image, whether there is an environmental change in the charging area.

10. The device of claim 9, wherein the foreign substance detector further comprises a foreign substance presence detector configured to detect, based on the difference between the RGB values of the frames of the image, ingress of the foreign substance.

11. The device of claim 10, wherein the foreign substance detector further comprises an exception handler configured to allow re-detection of the image to be performed when a factor causing the change in the image is not discriminated.

12. The device of claim 9, wherein the foreign substance classifier is configured to classify, based on a magnitude, a position, or a frame variance of a change in the image, the foreign substance.

* * * * *